(12) United States Patent
Kamio

(10) Patent No.: US 11,226,033 B2
(45) Date of Patent: Jan. 18, 2022

(54) SHIFT RANGE CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 153 days.

(21) Appl. No.: 16/536,506

(22) Filed: Aug. 9, 2019

(65) Prior Publication Data

US 2019/0360581 A1 Nov. 28, 2019

Related U.S. Application Data

(63) Continuation of application No. PCT/JP2018/005469, filed on Feb. 16, 2018.

(30) Foreign Application Priority Data

Feb. 24, 2017 (JP) .............................. JP2017-033154

(51) Int. Cl.
*F16H 59/08* (2006.01)
*F16H 61/32* (2006.01)
*F16H 63/38* (2006.01)

(52) U.S. Cl.
CPC ............. *F16H 59/08* (2013.01); *F16H 61/32* (2013.01); *F16H 63/38* (2013.01); *F16H 2061/326* (2013.01)

(58) Field of Classification Search
CPC .... F16H 59/08; F16H 61/32; F16H 2061/326; F16H 63/38; F16H 2061/243; F16H 2061/247
See application file for complete search history.

(56) References Cited

U.S. PATENT DOCUMENTS

| 2005/0174084 A1 | 8/2005 | Nakai et al. | |
|---|---|---|---|
| 2006/0103339 A1 | 5/2006 | Yamada et al. | |
| 2014/0176037 A1* | 6/2014 | Yoshimuta | ................ H02P 6/16 318/632 |
| 2015/0381858 A1* | 12/2015 | Sterngren | ............ F16M 13/022 348/143 |
| 2017/0335960 A1 | 11/2017 | Nagata et al. | |
| 2017/0344029 A1* | 11/2017 | Hashimoto | ........ G05B 19/0428 |

FOREIGN PATENT DOCUMENTS

| CN | 1801597 A | 7/2006 |
|---|---|---|
| JP | 6-193729 | 7/1994 |
| JP | 2008-95836 | 4/2008 |
| JP | 2009-177965 | 8/2009 |
| JP | 2016-161111 | 9/2016 |
| JP | 2017-227307 | 12/2017 |
| WO | 2018/155332 | 8/2018 |

* cited by examiner

*Primary Examiner* — Bobby Rushing, Jr.
(74) *Attorney, Agent, or Firm* — Nixon & Vanderhye P.C.

(57) ABSTRACT

A shift range control device switches a shift range by controlling the driving operation of a motor in a shift range switching system. The shift range control device includes a drive control unit, a stop control unit, and a return control unit. The drive control unit drives the motor so that an engagement member engages in one of recess portions corresponding to a requested shift range. The stop control unit stops the motor at a target position corresponding to the requested shift range. When the requested shift range corresponds to one of both ends of multiple recess portions, the return control unit returns the rotation position of the motor after the motor stops at the target position.

6 Claims, 13 Drawing Sheets

SHIFT RANGE CONTROL DEVICE

CROSS REFERENCE TO RELATED APPLICATION

The present application is a continuation application of International Patent Application No. PCT/JP2018/005469 filed on Feb. 16, 2018, which designated the U.S. and claims the benefit of priority from Japanese Patent Application No. 2017-33154 filed on Feb. 24, 2017. The entire disclosures of all of the above applications are incorporated herein by reference.

TECHNICAL FIELD

The present disclosure relates to relates to a shift range control device.

BACKGROUND

Conventionally, a shift range switching device has been known which switches a shift range by controlling a motor in response to a shift range switching request from a driver. For example, a switched reluctance motor is used as a driving source of a shift range switching mechanism. Hereinafter, the switched reluctance motor is referred to as an "SR motor".

SUMMARY

According to an example embodiment a shift range control device switches a shift range by controlling the driving operation of a motor in a shift range switching system. The shift range control device includes a drive control unit, a stop control unit, and a return control unit. The drive control unit drives the motor so that an engagement member engages in one of recess portions corresponding to a requested shift range. The stop control unit stops the motor at a target position corresponding to the requested shift range. When the requested shift range corresponds to one of both ends of multiple recess portions, the return control unit returns the rotation position of the motor after the motor stops at the target position.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Incidentally, an allowance such as a gear backlash exists between a motor shaft and an output shaft to which the rotation of the motor is transmitted. For that reason, when the motor rotates from a state in which the motor shaft and the output shaft are separated from each other within a range of the allowance, a response is delayed by an amount corresponding to an idle running. It is an object of the present disclosure to provide a shift range control device capable of improving a responsiveness.

A shift range control device according to the present disclosure includes a motor, an output shaft to which the drive of the motor is transmitted, and a shift range switching mechanism, and switches a shift range by controlling the drive of the motor in a shift range switching system in which an allowance exists between a motor shaft, which is a rotation shaft of the motor, and the output shaft. The shift range switching mechanism includes a driven member, an engagement member, and an urging member. The driven member is formed with multiple recess portions and rotates together with the output shaft. The engagement member fits in any recess portion corresponding to the shift range. The urging member urges the engagement member in a direction in which the engagement member fits into the recess portion. The shift range control device includes a drive control unit, a stop control unit, and a return control unit. The drive control unit drives the motor so that the engagement member fits into the recess portion corresponding to a requested shift range. The stop control unit stops the motor at the target position corresponding to the requested shift range. When the requested shift range is a range corresponding to one of both ends of the multiple recess portions, the return control unit performs a return control to return a rotational position of the motor within an allowance range after the motor has stopped at a target position. The return control unit performs the return control for rotating the motor in a direction opposite to the rotation direction of the motor at the time of the present range switching and reducing the amount of allowance, thereby being capable of reducing a period during which an idle running state occurs at the time of a next range switching, and therefore, the responsiveness is improved.

EMBODIMENTS

Figure 1:
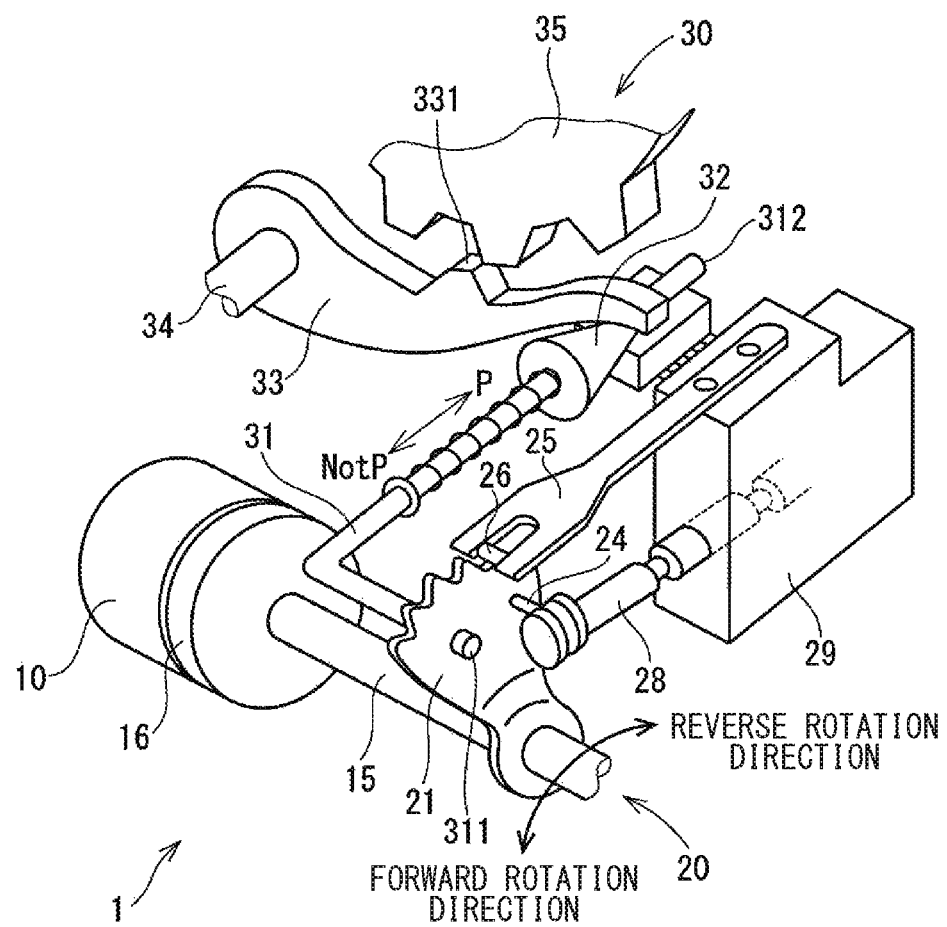
FIG. 1 is a perspective view of a shift-by-wire system according to an embodiment.
Figure 2:
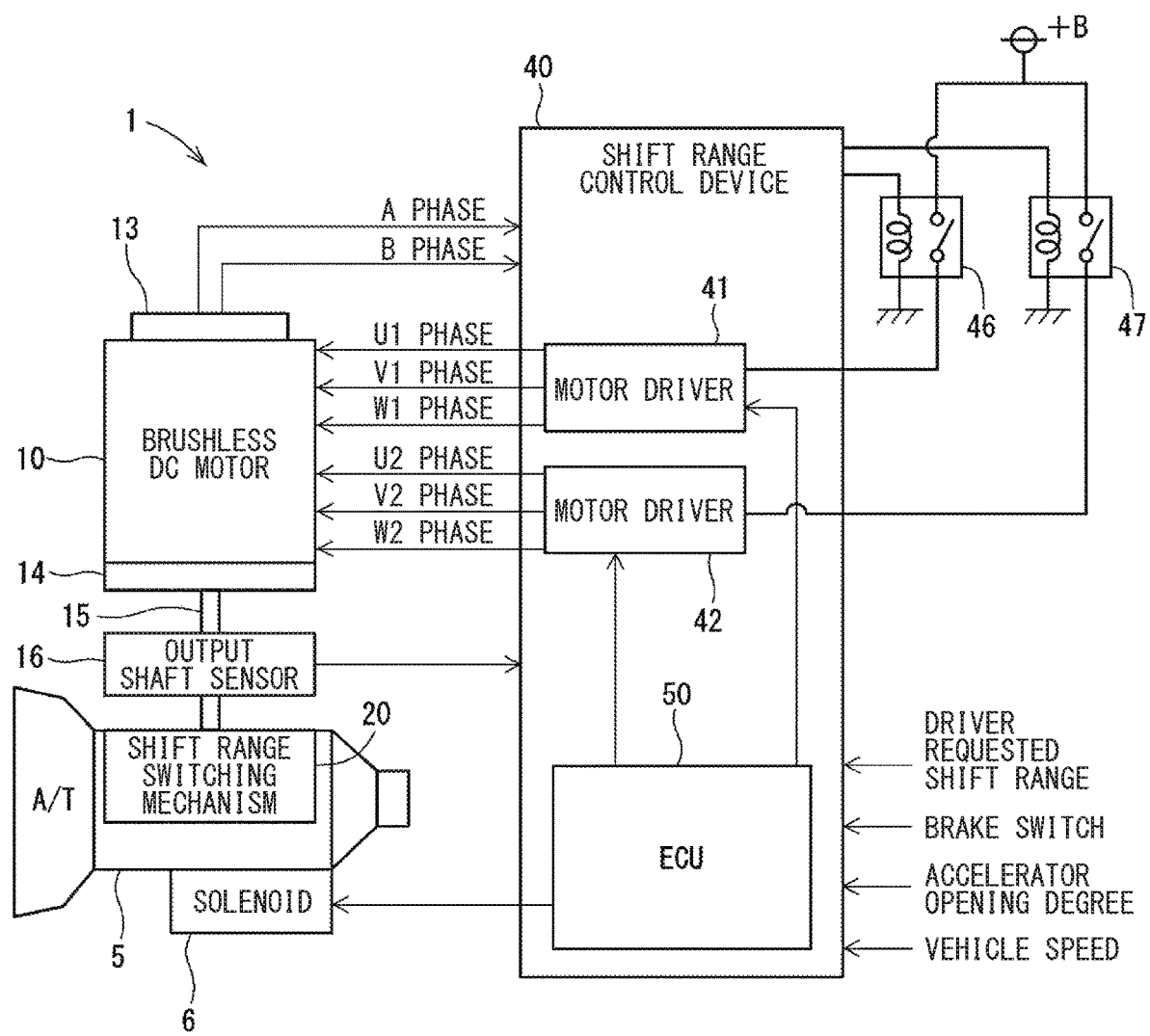
FIG. 2 is a schematic configuration diagram illustrating the shift-by-wire system according to the embodiment.
Figure 3:
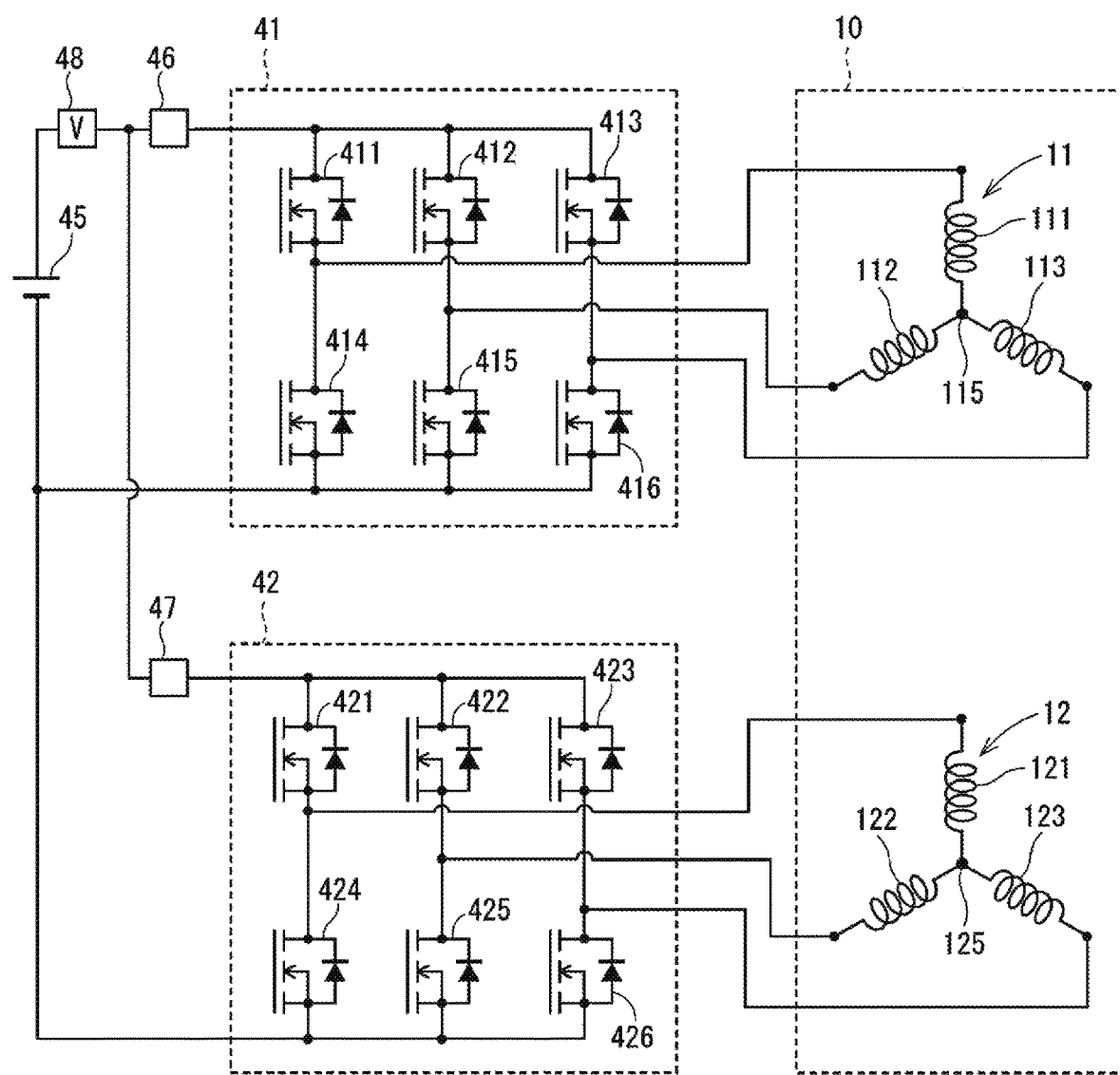
FIG. 3 is a circuit diagram illustrating a motor and a motor driver according to the embodiment.

A shift range control device according to an embodiment is shown in FIGS. 1 to 14. As shown in FIGS. 1 and 2, a shift-by-wire system 1 as a shift range switching system includes a motor 10, a shift range switching mechanism 20, a parking lock mechanism 30, a shift range control device 40, and the like. The motor 10 rotates upon receiving an electric power from a battery 45 (refer to FIG. 3) mounted on a vehicle (not shown), and functions as a driving source of the shift range switching mechanism 20. The motor 10 can change the magnitude of a current by a feedback control and can change a command for each phase. The motor 10 according to the present embodiment is a DC brushless motor of a permanent magnet type. As shown in FIG. 3, the motor 10 has two winding sets 11 and 12. The first winding set 11 includes a U1 coil 111, a V1 coil 112, and a W1 coil 113. The second winding set 12 includes a U2 coil 121, a V2 coil 122, and a W2 coil 123.

As shown in FIG. 2, the encoder 13 detects a rotational position of a rotor (not shown) of the motor 10. The encoder 13 is, for example, a magnetic rotary encoder, and includes a magnet that rotates integrally with the rotor, a Hall IC for magnetic detection, and the like. The encoder 13 outputs pulse signals of A-phase and B-phase at every predetermined angle in synchronization with the rotation of the rotor. A speed reducer 14 is provided between a motor shaft 105 (refer to FIGS. 9A and 9B), which is a rotational shaft of the motor 10, and an output shaft 15, and decelerates the rotation of the motor 10 to output decelerated rotation to the output shaft 15. As a result, the rotation of the motor 10 is transmitted to the shift range switching mechanism 20. The power shaft 15 is provided with an output shaft sensor 16 for detecting an angle of the output shaft 15. The output shaft sensor 16 is, for example, a potentiometer. Hereinafter, a detection value of the output shaft sensor 16 is appropriately set as an output shaft angle θs. In the present embodiment, an allowance such as a gear backlash exists between the motor shaft 105 and the output shaft 15.

As shown in FIG. 1, the shift range switching mechanism 20 includes a detent plate 21, a detent spring 25, and the like, and transmits a rotational driving force output from the speed reducer 14 to a manual valve 28 and a parking lock mechanism 30. The detent plate 21 is fixed to the output shaft 15 and driven by the motor 10. In the present embodiment, a direction in which the detent plate 21 is away from a base of the detent spring 25 is defined as a forward rotation direction and a direction approaching the base portion is defined as a reverse rotation direction.

The detent plate 21 is provided with a pin 24 projecting parallel to the output shaft 15. The pin 24 is connected to a manual valve 28. When the detent plate 21 is driven by the motor 10, the manual valve 28 reciprocates in an axial direction. In other words, the shift range switching mechanism 20 converts a rotational motion of the motor 10 into a linear motion and transmits the linear motion to the manual valve 28. The manual valve 28 is provided in a valve body 29. When the manual valve 28 reciprocates in an axial direction, a hydraulic supply path to a hydraulic clutch (not shown) is switched, and an engagement state of the hydraulic clutch is switched, thereby changing the shift range.

Figure 8:
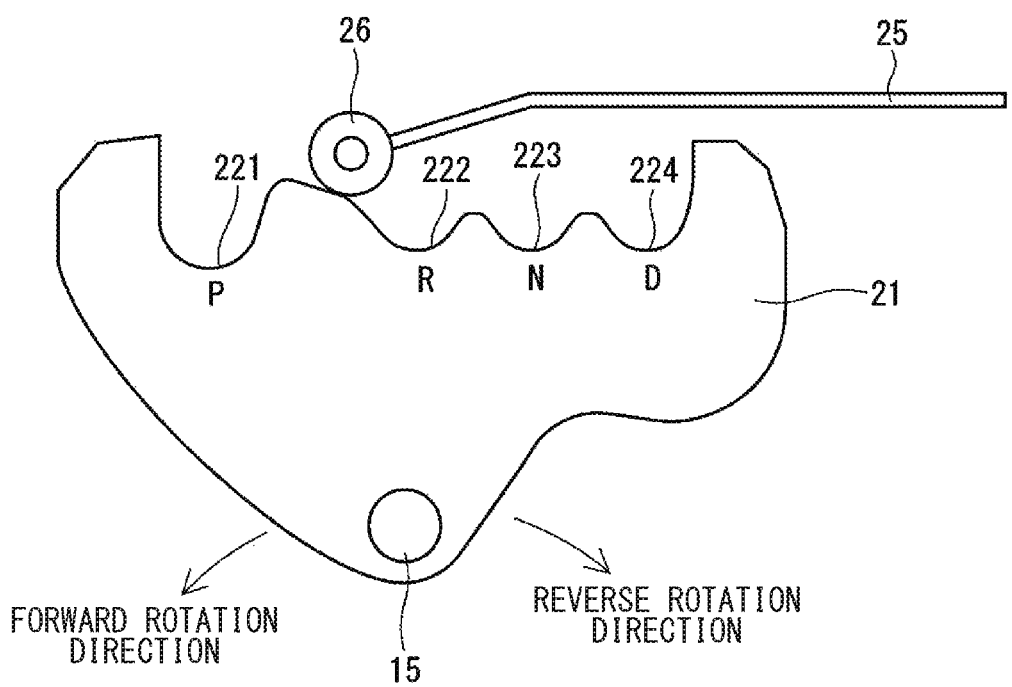
FIG. 8 is a plan view illustrating a detent plate according to the embodiment.

As shown in FIGS. 1 and 8, the detent spring 25 side of the detent plate 21 is provided with four recess portions 221 to 224 for holding the manual valve 28 at positions corresponding to the respective ranges. The recess portions 221 to 224 are arrayed in the order of the first recess portion 221, the second recess portion 222, the third recess portion 223, and the fourth recess portion 224 from a tip side of the detent spring 25. In other words, in the recess portions 221 to 224, the recess portions 221 and 224 are disposed at both ends of the array. The first recess portion 221 corresponds to a P range, the second recess portion 222 corresponds to an R range, the third recess portion 223 corresponds to an N range, and the fourth recess portion 224 corresponds to a D range.

The detent spring 25 is an elastically deformable plate-like member, and is provided with a detent roller 26 at a tip of the detent spring 25. The detent roller 26 fits into one of the recess portions 221 to 224. The detent spring 25 urges the detent roller 26 toward the center of rotation of the detent plate 21. When a predetermined or more rotating force is applied to the detent plate 21, the detent spring 25 elastically deforms, and the detent roller 26 moves on the recess portions 221 to 224. For example, when switching from the P range to the D range, the detent plate 21 rotates in the forward rotation direction, so that the detent roller 26 moves from the first recess portion 221 to the fourth recess portion 224 and fits into the fourth recess portion 224. When the detent roller 26 is fitted into any one of the recess portions 221 to 224, the swinging motion of the detent plate 21 is regulated, the axial position of the manual valve 28 and the state of the parking lock mechanism 30 are determined, and the shift range of an automatic transmission 5 is fixed.

As shown in FIG. 1, the parking lock mechanism 30 includes a parking rod 31, a conical body 32, a parking lock pawl 33, a shaft portion 34, and a parking gear 35. The parking rod 31 is formed in a substantially L-shape, and one end 311 of the parking rod 31 is fixed to the detent plate 21. The conical body 32 is provided on the other end 312 side of the parking rod 31. The conical body 32 is formed so as to decrease in diameter toward the other end 312. When the detent plate 21 swings in the reverse rotation direction, the conical body 32 moves in a direction of an arrow P.

The parking lock pawl 33 abuts against a conical surface of the conical body 32, and a projection portion 331 that can mesh with the parking gear 35 is provided on the parking gear 35 side of the parking lock pawl 33 which is provided so as to be swingable about the shaft portion 34. When the detent plate 21 rotates in the reverse rotation direction and the conical body 32 moves in the arrow P direction, the parking lock pawl 33 is pushed up, and the projection portion 331 and the parking gear 35 mesh with each other. On the other hand, when the detent plate 21 rotates in the forward rotational direction and the conical body 32 moves in a direction of an arrow non-P, the engagement between the projection portion 331 and the parking gear 35 is released.

The parking gear 35 is provided on an axle (not shown) so as to be engageable with the projection portion 331 of the parking lock pawl 33. When the parking gear 35 and the projection portion 331 are engaged with each other, the rotation of the axle is regulated. When the shift range is the NotP range other than the shift range P, the parking gear 35 is not locked by the parking lock pawl 33, and the rotation of the axle is not hindered by the parking lock mechanism 30. When the shift range is the P range, the parking gear 35 is locked by the parking lock pawl 33, and the rotation of the axle is regulated.

As shown in FIGS. 2 and 3, the shift range control device 40 includes motor drivers 41 and 42, an ECU 50, and the like. The motor driver 41 is a three-phase inverter for switching the energization of the first winding set 11, and switching elements 411 to 416 are bridge-connected to each other. One end of the U1 coil 111 is connected to a connection point of the U-phase switching elements 411 and 414 which are paired with each other. One end of the V1 coil 112 is connected to a connection point of the V-phase switching elements 412 and 415 which are paired with each other. One end of the W1 coil 113 is connected to a connection point of the W-phase switching elements 413 and 416 which are paired with each other. The other ends of the coils 111 to 113 are connected to each other by a connection portion 115.

The motor driver 42 is a three-phase inverter for switching the energization of the second winding set 12, and switching elements 421 to 426 are bridge-connected to each other. One end of the U2 coil 121 is connected to a connection point of the U-phase switching elements 421 and 424 which are paired with each other. One end of the V2 coil 122 is connected to a connection point of the V-phase switching elements 422 and 425 which are paired with each other. One end of the W2 coil 123 is connected to a connection point of the W-phase switching elements 423 and 426 which are paired with each other. The other ends of the coils 121 to 123 are connected to each other by a connection unit 125. The switching elements 411 to 416 and 421 to 426 according to the present embodiment are MOSFET, but may be formed of other elements such as an IGBT.

A motor relay 46 is provided between the motor driver 41 and the battery 45. A motor relay 47 is provided between the motor driver 42 and the battery 45. The motor relays 46 and 47 are turned on when a start switch such as an ignition switch or the like is turned on, and an electric power is supplied to the motor 10 side. The motor relays 46 and 47 are turned off when the start switch is turned off, and the supply of the electric power to the motor 10 side is cut off. A voltage sensor 48 for detecting a battery voltage V is provided on a high potential side of the battery 45. The shift range control device 40 is provided with a current sensor (not shown) for detecting a motor current Im.

The ECU 50 controls the driving of the motor 10 by controlling on/off operations of the switching elements 411 to 416 and 421 to 426. The ECU 50 controls the drive of the shift hydraulic control solenoids 6 based on a vehicle speed, an accelerator opening degree, a driver requested shift range, and the like. A transmission stage is controlled by controlling the shift hydraulic control solenoids 6. The number of the shift hydraulic control solenoids 6 corresponding to the number of transmission stages and the like is provided. In the present embodiment, one ECU 50 controls the driving of the motor 10 and the solenoids 6, but a motor control ECU for controlling the motor 10 and a solenoid control AT-ECU may be separated from each other. Hereinafter, the drive control of the motor 10 will be mainly described.

Figure 4:
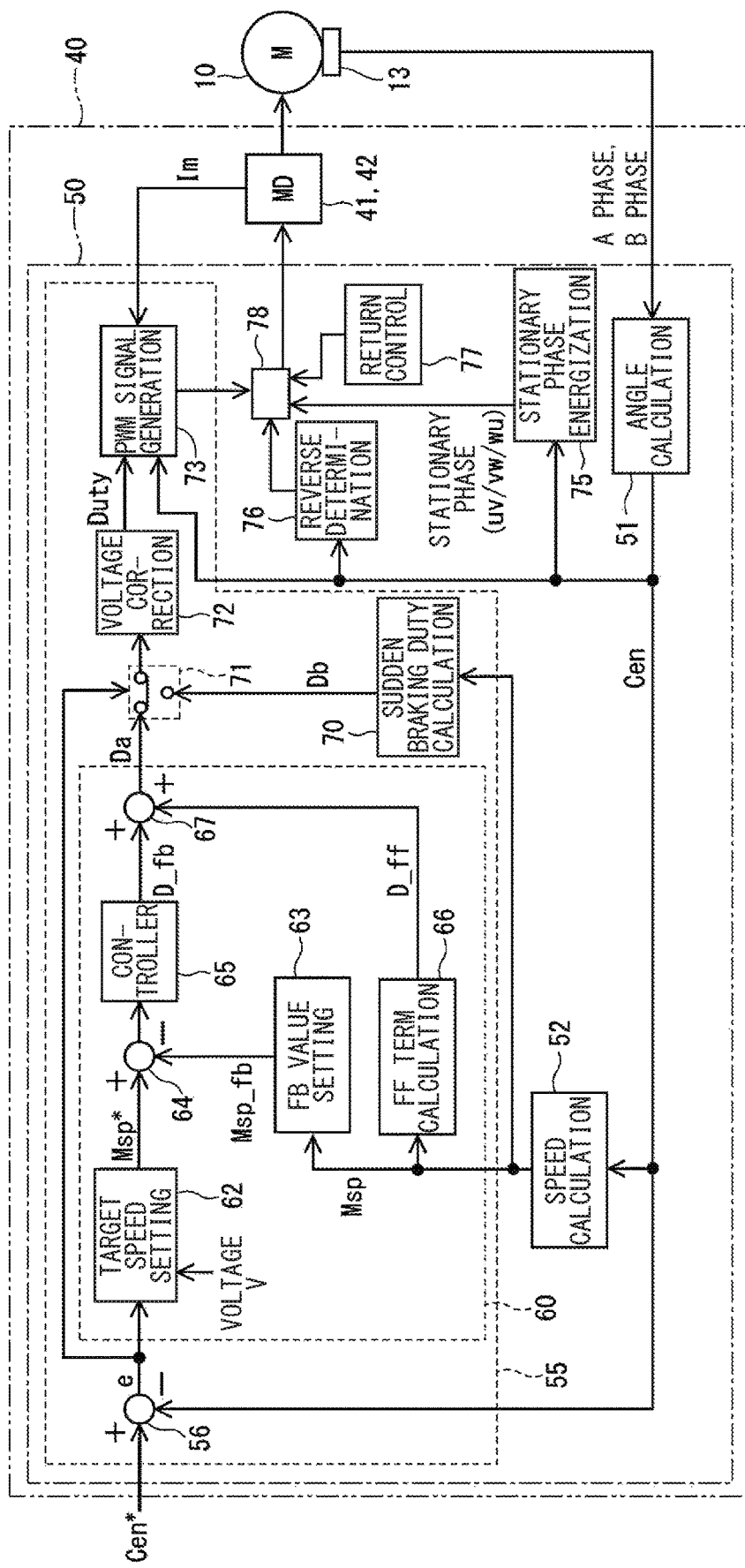
FIG. 4 is a block diagram illustrating a shift range control device according to the embodiment.
Figure 5:
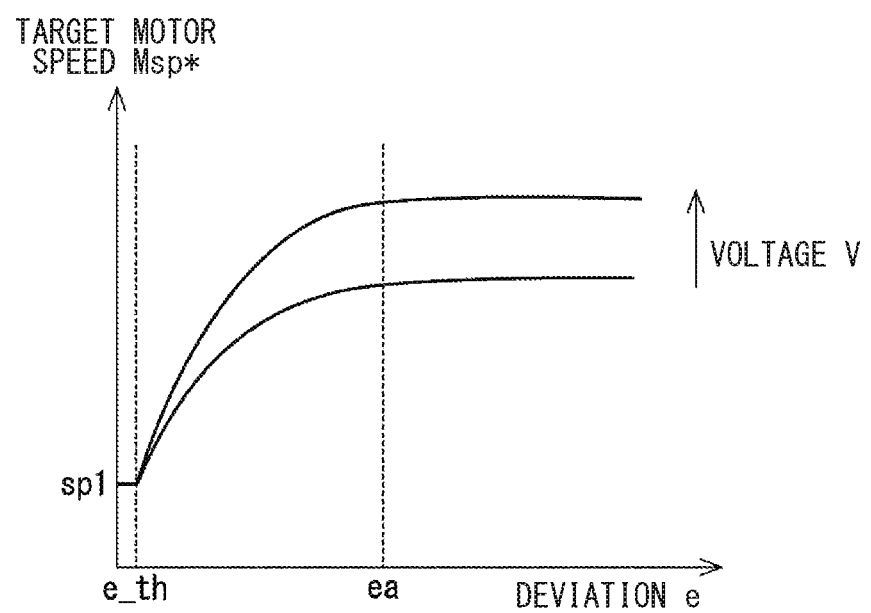
FIG. 5 is an illustrative diagram illustrating target speed setting according to the embodiment.

As shown in FIG. 4, the ECU 50 includes an angle calculation unit 51, a speed calculation unit 52, a drive control unit 55, a stationary phase energization control unit 75 as a stopping control unit, a reverse determination unit 76, a return control unit 77, a second switching control unit 78, and the like, and is configured mainly by a microcomputer and the like. The processing in the ECU 50 may be software processing by executing programs stored in advance in a tangible memory such as a ROM by a CPU, or hardware processing by a dedicated electronic circuit.

The angle calculation unit 51 calculates an actual count value Cen, which is a count value of the encoder 13, based on the pulses of the A-phase and the B-phase output from the encoder 13. The actual count value Cen is a value corresponding to an actual mechanical angle and an electrical angle of the motor 10. The speed calculation unit 52 calculates a motor speed Msp, which is the rotation speed of the motor 10, based on the actual count value Cen.

The drive control unit 55 includes an angle deviation calculation unit 56, a feedback control unit 60, a sudden braking duty calculation unit 70, a first switching control unit 71, a voltage correction unit 72, and a PWM signal generation unit 73. The drive control unit 55 controls the drive of the motor 10 so that the motor 10 is at the target position. The angle deviation calculation unit 56 calculates a difference between a target count value Cen* and the actual count value Cen according to the driver requested shift range input by operating a shift lever (not shown) or the like. Hereinafter, an absolute value of a difference between the target count value Cen* and the actual count value Cen is referred to as an angle deviation e. In the present embodiment, the actual count value Cen is set to the "actual angle" and the target count value Cen* is set to the "target angle".

The feedback control unit 60 includes a target speed setting unit 62, a feedback value setting unit 63, a speed deviation calculation unit 64, a controller 65, a feedforward term calculation unit 66, an adder 67, and the like. Hereinafter, the feedback is referred to as "FB" and the feedforward is referred to as "FF" as appropriate.

The target speed setting unit 62 calculates a target motor speed Msp*, which is a target speed of the motor 10, based on an angle deviation e. The target motor speed Msp* is set to be larger as the angle deviation e is larger when the angle deviation e is equal to or smaller than a predetermined value ea based on, for example, a map shown in FIG. 5, and is set to be a predetermined maximum value when the angle deviation e is larger than the predetermined value ea. In addition, the angle deviation e is set to a set speed sp1 (for example, 1000 rpm) at an angle determination threshold e_th. The target motor speed Msp* is set so as to increase as the battery voltage V increases.

When a control state of the motor 10 is a mode 2 or a mode 3 to be described later, that is, a steady-state control or a deceleration control, the FB value setting unit 63 performs a phase advance compensation for advancing a phase of the motor speed Msp, and sets a speed phase advance value Msp_pl as a speed feedback value Msp_fb. When the control state of the motor 10 is the mode 1, that is, the acceleration control, the FB value setting unit 63 does not perform the phase advance compensation, and sets the motor speed Msp to the speed feedback value Msp_fb. The speed phase advance value Msp_pl is also included in a concept of the "motor speed".

The speed deviation calculation unit 64 calculates a speed deviation ΔMsp between the target motor speed Msp* and the speed feedback value Msp-fb. In order to make the target motor speed Msp* coincide with the speed feedback value Msp_fb, the controller 65 calculates an FB duty D_fb by, for example, a P control or an PI control so that the speed deviation ΔMsp becomes 0.

The FF term calculation unit 66 calculates an FF duty D_ff according to the control state of the motor 10. The FF duty D_ff at the time of the acceleration control is a maximum acceleration duty calculated based on a map or the like shown in the FIG. 6A, and becomes larger as the motor speed Msp becomes higher. According to the present embodiment, the FF duty D_ff is calculated so that the FF duty becomes the maximum duty until the motor speed Msp becomes equal to or higher than the target motor speed Msp*. The FF duty D_ff at the time of the steady-state control is set to a speed maintenance duty calculated based on a map or the like shown in the FIG. 6B. The speed maintenance duty is a duty for maintaining the motor speed Msp at the time of no load, and increases as the motor speed Msp increases. The FF duty D_ff at the time of deceleration control is a deceleration correction duty calculated based on a map or the like shown in the FIG. 6C. The deceleration correction duty is a correction duty for realizing the target motor speed Msp*. The deceleration correction duty is a negative value when the motor 10 rotates in a forward direction, and becomes smaller as the motor speed Msp increases more. In other words, as the motor speed Msp increases, the deceleration correction duty becomes larger as an absolute value.

Figure 6A:
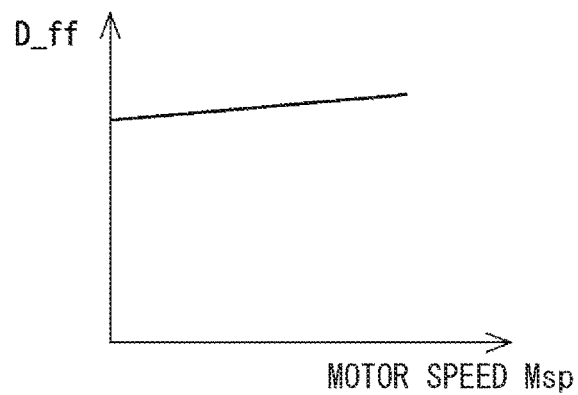
FIG. 6A is an illustrative diagram illustrating an FF duty at the time of an acceleration control according to the embodiment.
Figure 6B:
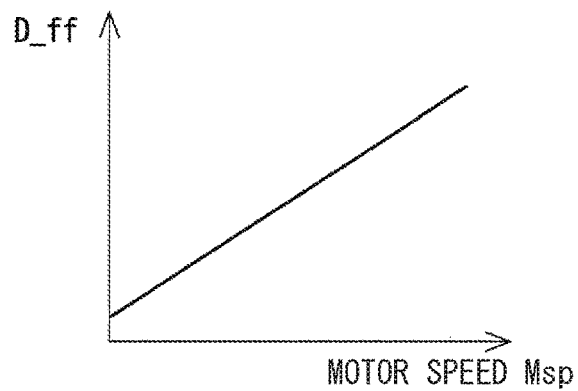
FIG. 6B is an illustrative diagram illustrating an FF duty at the time of a steady-state control according to the embodiment.
Figure 6C:
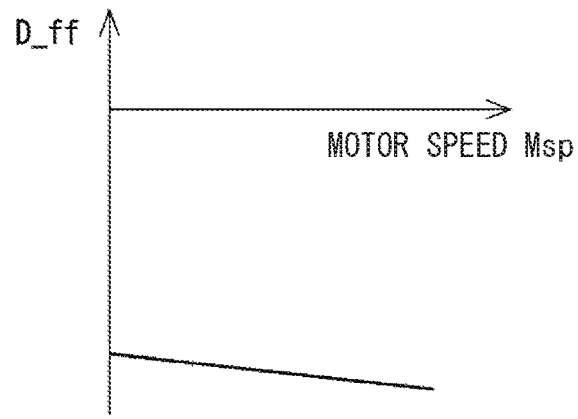
FIG. 6C is an illustrative diagram illustrating an FF duty at the time of a deceleration control according to the embodiment.

In FIGS. 6A, 6B and 6C, when the motor 10 rotates in the forward rotation direction and the motor 10 rotates in the reverse rotation direction, the positive and negative of a value of the FF duty D_ff are inverted. The same applies to a fixed duty Db to be described later. According to the present embodiment, the FF duty D_ff is calculated based on the motor speed Msp, but instead of the motor speed Msp, the FF duty D_ff may be calculated based on the target motor speed Msp*. The adder 67 adds the FB duty D_fb and the FF duty D_ff to calculate a corrected FB duty Da.

In the feedback control of the present embodiment, magnitudes of currents and torques flowing through the coils 111 to 113 and 121 to 123 can be changed by changing the duty by PWM control or the like. According to the present embodiment, the drive of the motor 10 is controlled by a rectangular wave control by 120° energization. In the rectangular wave control by 120° energization, the switching element on a high potential side of the first phase and the switching element on a low potential side of the second phase are turned on. Further, the energization phase is switched by switching the combination of the first phase and the second phase at every electrical angle of 60°. As a result, a rotating magnetic field is generated in the winding sets 11 and 12, and the motor 10 rotates. In the present embodiment, the rotation direction of the motor 10 when the output shaft 15 is rotated in the forward rotation direction is defined as the forward direction. In addition, the duty when the motor 10 outputs a positive torque is assumed to be positive, the duty when the motor 10 outputs a negative torque is assumed to be negative, and an available duty range is assumed to fall within −100[%] to 100[%]. In other words, when the motor 10 is rotated in the forward direction, the duty is set to be positive, and when the motor 10 is rotated in the reverse direction, the duty is set to be negative. When a braking torque (that is, a negative torque) is generated in order to stop the motor 10 which is rotating in the positive direction, the rotation direction of the motor 10 is the forward rotation direction, but the duty is negative. Similarly, the duty is positive when the braking torque is generated to stop the motor 10 that is rotating reversely.

Figure 7:
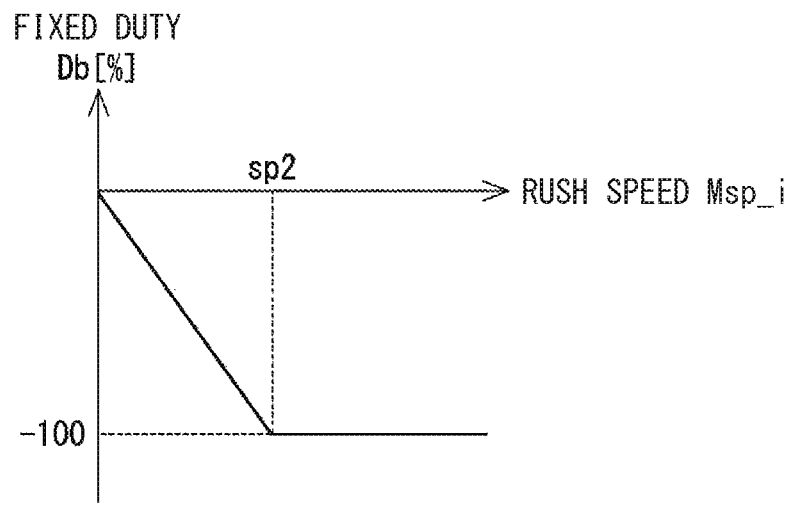
FIG. 7 is an illustrative diagram illustrating a fixed duty according to the embodiment.

The sudden braking duty calculation unit 70 calculates the fixed duty Db, which is a duty at the time of the sudden braking control, in accordance with a rush speed Msp_i, which is a motor speed Msp at the time of the start of the sudden braking control, that is, when the angle deviation e becomes smaller than the angle determination threshold e_th. As shown in FIG. 7, the fixed duty Db when the motor 10 is rotating in the forward direction is a negative value, and when the rush speed Msp_i is smaller than the predetermined speed sp2, the absolute value is larger as the rush speed Msp_i is larger, and when the rush speed Msp_i is equal to or larger than the predetermined speed sp2, the fixed duty Db is −100[%].

The first switching control unit 71 switches whether the duty used for signal generation is the corrected FB duty Da or the fixed duty Db. In the present embodiment, when the angle deviation e is equal to or larger than the angle determination threshold e_th, the FB duty after correction Da is selected, and when the angle deviation e is smaller than the angle determination threshold e_th, the fixed duty Db is selected as the duty used for signal generation, and is output to the voltage correction unit 72.

The voltage correction unit 72 corrects the selected corrected FB duty Da or fixed duty Db with the battery voltage V, and calculates a duty command value. The PWM signal generation unit 73 generates a command signal Spwm related to switching of the switching elements 411 to 416 and 421 to 426 based on the duty command value and the actual count value Cen. In addition, the PWM signal generation unit 73 adjusts the command signal Spwm so that the motor current Im does not exceed a current limit value Em-max.

The stationary phase energization control unit 75 performs stationary phase energization control. The stationary phase energization control is a control for stopping the rotation of the motor 10, and selects a stationary phase corresponding to an electric angle, and generates command signals Sfix related to switching of the switching elements 411 to 416 and 421 to 426 so that a current flows in a predetermined direction of the selected stationary phase. As a result, an excitation phase is fixed. When the excitation phase is fixed, the motor 10 stops at a predetermined electrical angle corresponding to the excitation phase. The stationary phase energization control unit 75 selects the stationary phase and the energization direction based on the actual count value Cen so as to stop the motor 10 at an electric angle closest from the current rotor position.

In the present embodiment, the stationary phase energization control is continued for a stationary phase energization duration Ta. The duty in a stationary phase energization period during which the stationary phase energization control is performed is kept constant at the maximum duty. In addition, the duty may be gradually changed so that the motor current at the end of the stationary phase energization control becomes 0 in a second period from the elapse of a predetermined time to an end of the stationary phase energization control with a first period from the start to the elapse of the predetermined time set as the maximum duty. The duty of the second period may be a predetermined value having an absolute value smaller than that of the maximum duty. With a reduction in the motor current at the end of the stationary phase energization control, the vibration of the motor shaft 105 when the energization is turned off from the stationary phase energization control can be reduced, and a state in which the output shaft 15 is stopped at a desired position can be appropriately maintained.

The reverse determination unit 76 determines whether or not the rotation of the motor 10 has been reversed based on the actual count value Cen. When the requested shift range is the P range or the D range, the return control unit 77 continues the stationary phase energization control for the stationary phase energization duration Ta to stop the motor 10, and thereafter the return control unit 77 slowly returns the motor 10 in an opposite direction within the allowance range. More specifically, when the requested shift range is the D range, the rotation direction of the motor 10 when the detent roller 26 is moved to the fourth recess portion 224 is the forward rotation direction, and in the return control, the motor 10 is rotated in the reverse rotation direction by the minimum drivable width. When the requested shift range is the P range, the rotation direction of the motor 10 when the detent roller 26 is moved to the first recess portion 221 is the reverse rotation direction, and in the return control, the motor 10 is rotated in the forward rotation direction by the minimum drivable width. When the detection value of the output shaft sensor 16 changes, the return control is terminated and the energization is turned off.

The second switching control unit 78 switches the signals output to the motor drivers 41 and 42. In the present embodiment, when the motor 10 is rotating in the rotational direction corresponding to the requested shift range, that is, before the motor 10 is reversed, the second switching control unit 78 selects the command signal Spwm generated by the PWM signal generation unit 73, and when the motor 10 is reversed, the second switching control unit 78 selects the command signal Sfix generated by the stationary phase energization control unit 75. When the return control is performed, the second switching control unit 78 selects a signal from the return control unit 77 as a command signal. The selected command signal is output to the motor drivers 41 and 42.

Figure 9A:
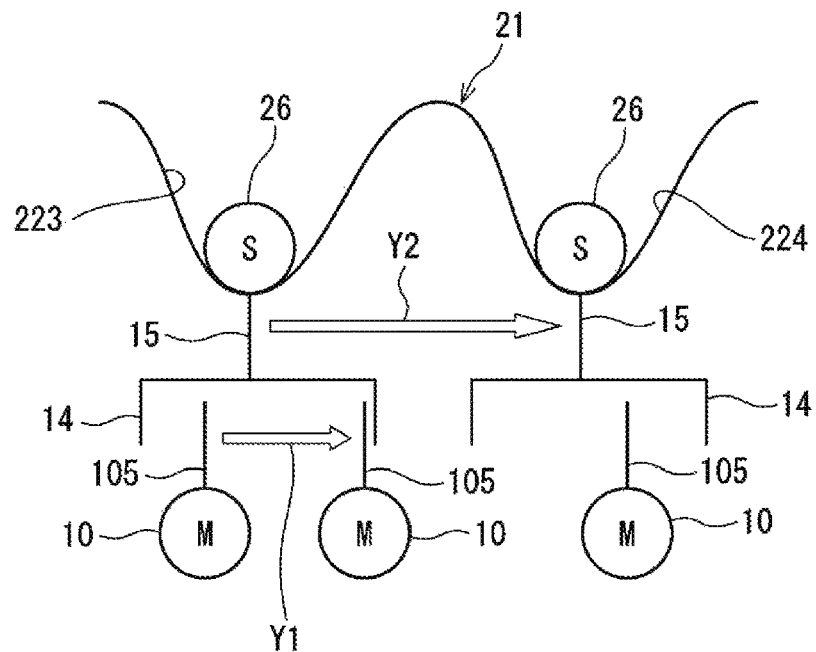
FIG. 9A is a schematic diagram illustrating a return control according to the embodiment.
Figure 9B:
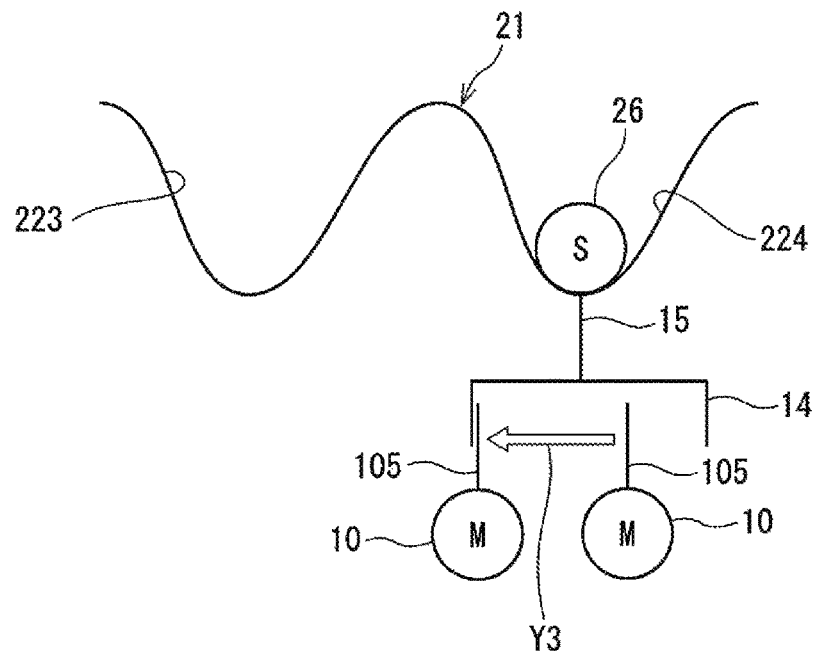
FIG. 9B is a schematic diagram illustrating the return control according to the embodiment.

Now, the return control will be described with reference to FIGS. 9A and 9B. Hereinafter, the switching from the N range to the D range will be described as an example. FIGS. 9A and 9B schematically show a state in which the detent roller 26 moves from the third recess portion 223 corresponding to the N range to the fourth recess portion 224 corresponding to the D range by rotating the motor 10. In FIGS. 9A and 9B, the rotational directions of the motor 10 and the output shaft 15 will be described as right and left directions in the drawing. In addition, FIGS. 9A and 9B are schematic diagrams conceptually showing "allowance", in which the output shaft 15 and the speed reducer 14 are integrated with each other, and the motor shaft 105 is described as being movable within the allowance range of the speed reducer 14. The motor shaft 105 and the speed reducer 14 may be integrated with each other so that "allowance" exists between the speed reducer 14 and the output shaft 15. In this example, the "allowance" between the motor shaft and the output shaft will be described mainly as the allowance present between the gear of the speed reducer 14 and the motor shaft 105. However, the "allowance" can be regarded as a sum total of allowance or rattling which is present between the motor shaft and the output shaft. Actually, the detent roller 26 moves between the recess portions 221 to 224 when the detent plate 21 rotates integrally with the output shaft 15, but in the FIGS. 9A and 9B, the detent roller 26 moves together with the output shaft 15.

As shown in FIGS. 9A and 9B, the speed reducer 14 is provided between the motor shaft 105 and the output shaft 15, and "allowance" including a gear allowance exists between the motor shaft 105 and the output shaft 15. As indicated by an arrow Y1 in the FIG. 9A, when the motor 10 rotates from a state in which the motor shaft 105 and the speed reducer 14 are separated from each other in the rotational direction, the motor 10 becomes idle until the motor shaft 105 and the speed reducer 14 come into contact with each other. At that time, the rotation of the motor 10 is not transmitted to the output shaft 15. Hereinafter, the idle running of the motor 10 within the range of allowance is referred to as "idle running".

When the motor shaft 105 and the speed reducer 14 come into contact with each other, the idle running state ends, and the motor shaft 105, the output shaft 15, and the detent plate 21 rotate together as indicated by an arrow Y2. As a result, the detent roller 26 mover beyond a crest portion between the recess portions 223 and 224 and moves to the recess portion 224. The detent roller 26 passes through the crest portion between the recess portions 223 and 224 by a driving force of the motor 10 and is then dropped into the recess portion 224 by a spring force of the detent spring 25. The motor 10 is controlled to stop within a range of the allowance when the detent roller 26 fits in the center of the recess portion 224.

When the shift range is switched from a range other than the D range to the D range, the motor 10 is rotated in the forward rotation direction. When the shift range is switched from the D range to a range other than the D range at the time of the next range switching, the motor 10 is necessarily rotated in the reverse rotation direction. Therefore, in the present embodiment, as indicated by an arrow Y3 in FIG. 9B, when the requested shift range is the D range, after the motor 10 is stopped at the target position, the return control for driving the motor 10 in the opposite direction within the allowance range is performed, and the motor shaft 105 and the output shaft 15 are brought into contact with each other in the reverse rotational direction.

In the return control, the motor 10 is slowly rotated in a direction opposite to the driving direction at the time of range switching by a minimum width corresponding to a resolution of the motor 10. When the motor 10 is driven within the allowance range, the detection value of the output shaft sensor 16 does not change, and when the motor shaft 105 and the speed reducer 14 come in contact with each other to drive the output shaft 15, a detection value of the output shaft sensor 16 changes. Therefore, when the detection value of the output shaft sensor 16 changes, it is considered that the motor shaft 105 and the speed reducer 14 are in contact with each other, and the return control is terminated. As a result, since the idle running state does not occur at the time of a next range switching, the responsiveness can be improved by an amount corresponding to the idle running.

Similarly, if the current range is the P range, the motor 10 is necessarily rotated in the forward rotation direction at the time of the next range switching. Therefore, when the requested shift range is the P range, the motor 10 is stopped at the target position, and then the return control is performed to bring the motor shaft 105 and the output shaft 15 into contact with each other in the forward rotation direction, thereby being capable of improving the responsiveness by the amount corresponding to the idle running. When the requested shift range is the R range or the N range, the rotation direction of the motor 10 at the time of the next range switching may be either the forward rotation direction or the reverse rotation direction, and therefore, the return control is not performed.

Figure 10:
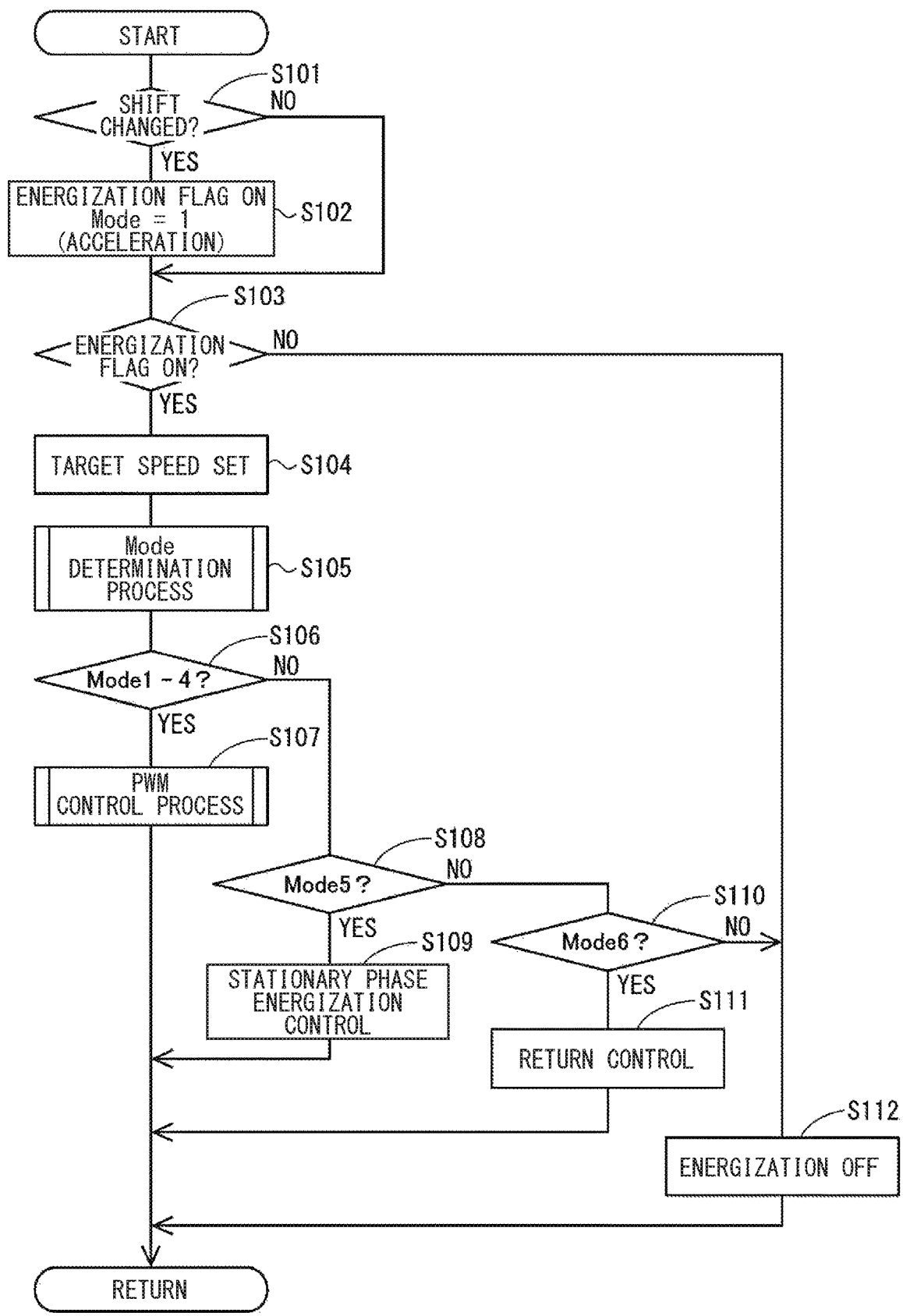
FIG. 10 is a flowchart illustrating a motor control process according to the embodiment.

The motor control process will be described with reference to a flowchart of FIG. 10. This processing is executed in a predetermined cycle by the ECU 50 during a period during which a start switch, which is an ignition switch or the like, is turned on. Hereinafter, the "Step" of Step S101 is omitted, and a symbol "S" is simply referred to. The same applies to the other steps.

Prior to a description of the motor control process, the control modes of the motor 10 will be summarized. Mode 1 is an "acceleration control" and accelerates the rotation of the motor 10. Mode 2 is a "steady-state control" in which the rotation speed of the motor 10 is kept substantially constant. Mode 3 is a "deceleration control" for decelerating the rotation of the motor 10. Mode 4 is a "sudden braking control" and suddenly brakes the rotation of the motor 10. Mode 5 is a "stationary phase energization control" and stops the motor 10. Mode 6 is a "return control" in which the motor 10 is slowly rotated in the opposite direction to that in the acceleration control and the steady-state control. Mode 0 is an "energization off", and stops the energization to the motor 10.

In a first S101, the ECU 50 determines whether or not a shift lever (not shown) is operated by the driver and the driver requested shift range is changed. If it is determined that the driver requested shift range has not changed (NO in S101), the process proceeds to S103. If it is determined that the driver requested shift range has changed (YES in S101), the process proceeds to S102.

In S102, the ECU 50 turns on an energization flag for the motor 10. Further, the ECU 50 sets the control state to the mode 1 which is the acceleration control. In S103, the ECU 50 determines whether or not the energization flag is turned on. When it is determined that the energization flag is off (NO in S103), the process shifts to S112. When it is determined that the energization flag is on (YES in S103), the process shifts to S104. In S104, the target speed setting unit 62 sets the target motor speed Msp*. In S105, the ECU 50 performs a mode determination process.

Figure 11:
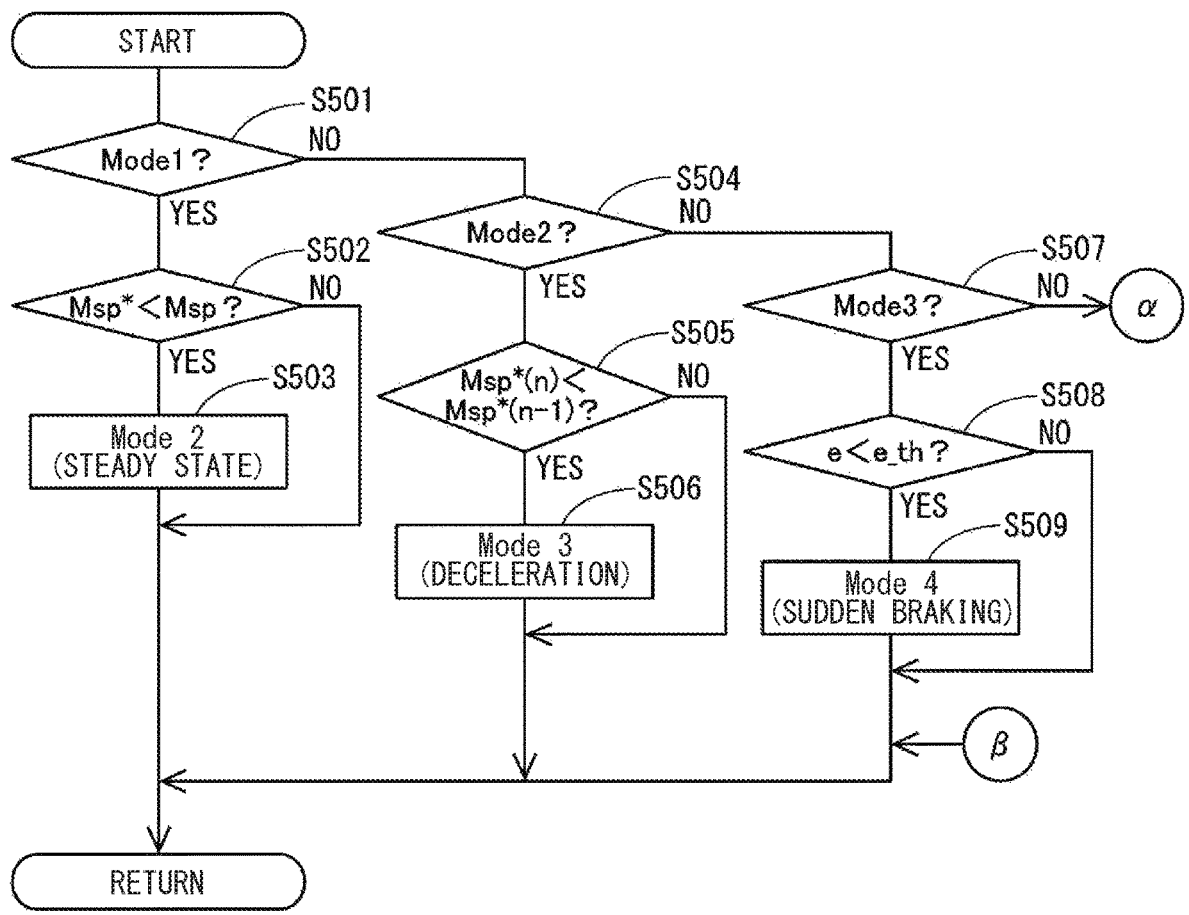
FIG. 11 is a flowchart illustrating a mode determination process according to the embodiment.

The mode determination process will be described with reference to FIGS. 11 and 12. In S501 in FIG. 11, the ECU 50 determines whether the control mode is the mode 1 or not. When it is determined that the control mode is not the mode 1 (NO in S501), the process shifts to S504. When it is determined that the control mode is the mode 1 (YES in S501), the process shifts to S502.

In S502, the ECU 50 determines whether or not the target motor speed Msp* is lower than the present motor speed Msp. When it is determined that the target motor speed Msp* is equal to or higher than the present motor speed Msp (NO in S502), the mode 1 is continued. If it is determined that the target motor speed Msp* is lower than the present motor speed Msp (YES in S502), the process proceeds to S503. In S503, the ECU 50 sets the control mode as the mode 2, which is the steady-state control.

In S504 when the control mode is determined not to be mode 1 (NO in S501), the ECU 50 determines whether or not the control mode is the mode 2. When it is determined that the control mode is not the mode 2 (NO in S504), the process shifts to S507. When it is determined that the control mode is the mode 2 (YES in S504), the process shifts to S505.

In S505, the ECU 50 determines whether or not the current value Msp*(n) of the target motor speed is smaller than a previous value Msp*(n−1). When it is determined that the Msp*(n) of the target motor speed is equal to or higher than the previous value Msp*(n−1) (NO in S505), the mode 2 is continued. When it is determined that the Msp*(n) of the target motor speed is smaller than the previous value Msp*(n−1) (YES in S505), the process proceeds to S506. In S506, the ECU 50 sets the control mode as the mode 3, which is the deceleration control.

In S507 when it is determined that the control mode is not the modes 1 and 2 (NO in S504), the ECU 50 determines whether the control mode is the mode 3 or not. When it is determined that the control mode is not the mode 3 (NO in S507), the process shifts to S510 in FIG. 12. When it is determined that the control mode is the mode 3 (YES in S507), the process shifts to S508.

In S508, the ECU 50 determines whether or not the angle deviation e is smaller than the angle determination threshold e_th. When it is determined that the angle deviation e is equal to or larger than the angle determination threshold e_th (NO in S508), the mode 3 is continued. When it is determined that the angle deviation e is smaller than the angle determination threshold e_th (YES in S508), the process proceeds to S509. In S509, the ECU 50 sets the control mode as the mode 4, which is the sudden braking control.

Figure 12:
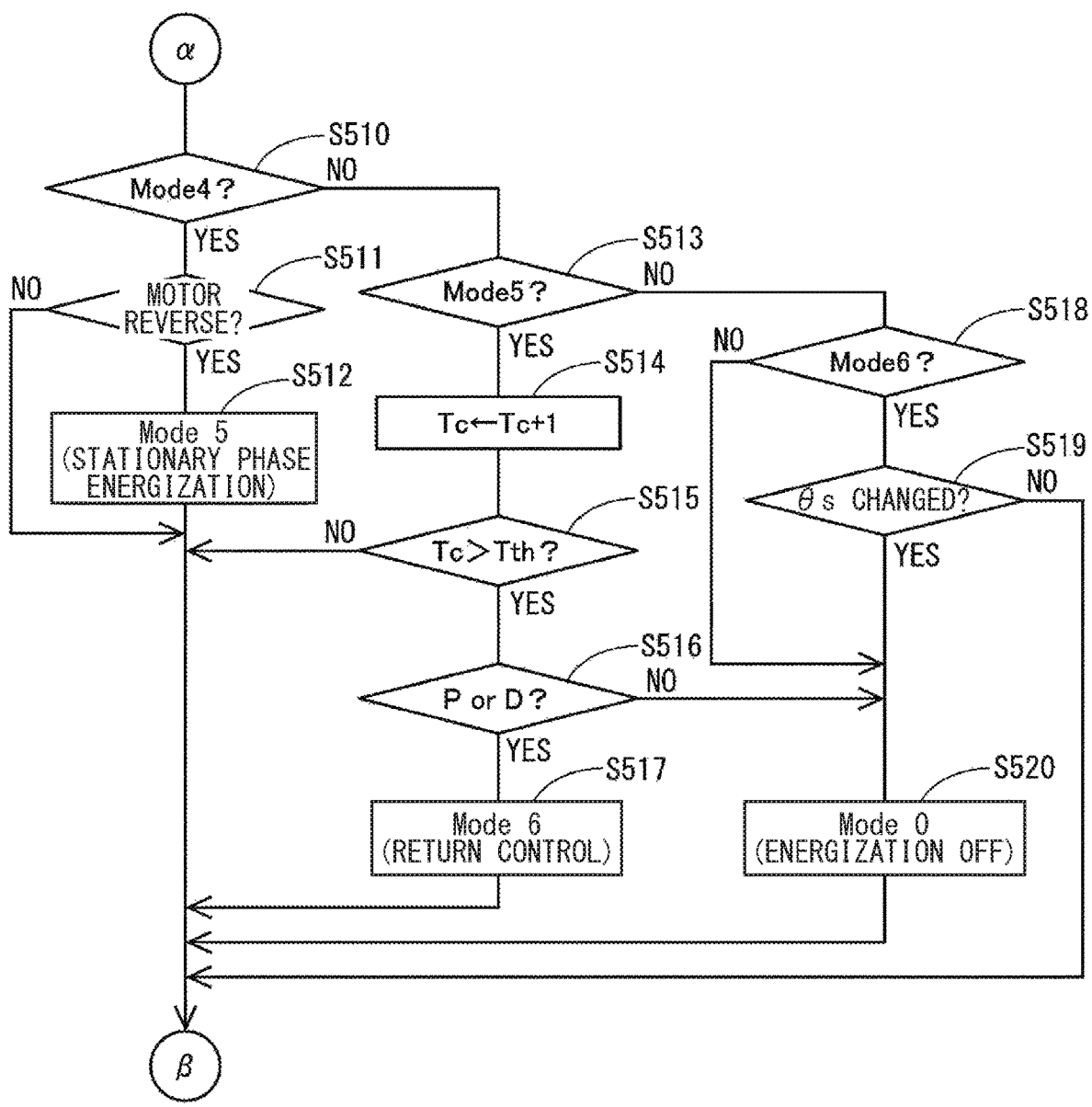
FIG. 12 is a flowchart illustrating a mode determination process according to the embodiment.
Figure 13:
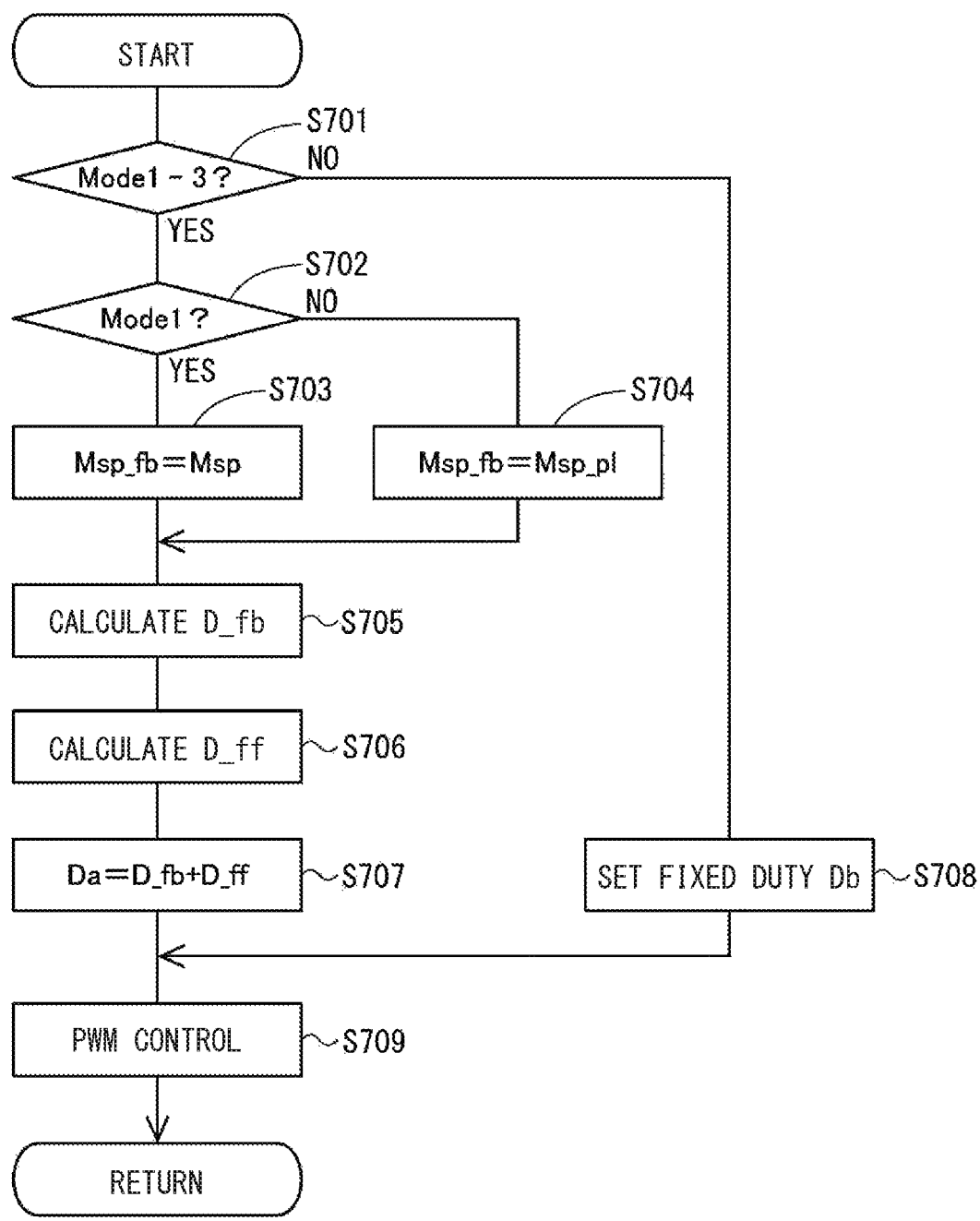
FIG. 13 is a flowchart illustrating a PWM control process according to the embodiment.

As shown in FIG. 12, in S510 where the control mode is determined not to be modes 1 to 3 (NO in S507), the ECU 50 determines whether the control mode is the mode 4 or not. When it is determined that the control mode is not the mode 4 (NO in S510), the process shifts to S513. When it is determined that the control mode is the mode 4 (YES in S510), the process shifts to S511.

In S511, the ECU 50 determines whether or not the motor 10 has been reversed by the reverse determination unit 76. In this example, if the motor 10 rotates in a direction opposite to the rotation direction determined based on the shift ranges before and after the switching, it is determined that the motor 10 is reversed. When it is determined that the motor 10 is not reversed (NO in S511), the mode 4 is continued. When it is determined that the motor 10 is reversed (YES in S511), the process proceeds to S512. In S512, the ECU 50 sets the control mode to the mode 5 which is the stationary phase energization control.

In S513 when it is determined that the control mode is not the mode 1 to the mode 4 (NO in S510), the ECU 50 determines whether the control mode is the mode 5 or not. When it is determined that the control mode is not the mode 5 (NO in S513), the process shifts to S518. When it is determined that the control mode is the mode 5 (YES in S513), the process shifts to S514.

In S514, the ECU 50 increments a timer value Tc, which is a count value of a timer for counting a duration of the stationary phase energization control. In S515, the ECU 50 determines whether or not the timer value Tc is larger than a duration determination threshold Tth. The duration determination threshold Tth is a value set in accordance with the stationary phase energization duration Ta (for example, 100 ms) for continuing the stationary phase energization control. When it is determined that the timer value Tc is equal to or smaller than the duration determination threshold Tth (NO in S515), the mode 5 is continued. When it is determined that the timer value Tc is larger than the duration determination threshold Th (YES in S515), the process proceeds to S516.

In S516, the ECU 50 determines whether or not the driver requested shift range is the P range or the D range. When it is determined that the driver requested shift range is not the P range or the D range (NO in S516), that is, when the driver requested shift range is the R range or the N range, the process proceeds to S520. When it is determined that the driver requested shift range is the P range or the D range (YES in S516), the process proceeds to S517. In S517, the ECU 50 assumes that the control mode is the mode 6 which is the return control.

In S518 when it is determined that the control mode is not the mode 1 to the mode 5 (NO in S513), the ECU 50 determines whether the control mode is the mode 6 or not. When it is determined that the control mode is not the mode 6 (NO in S518), the process shifts to S520. When it is determined that the control mode is the mode 6 (YES in S518), the process shifts to S519. In S519, the ECU 50 determines whether or not the output shaft angle θs has changed. When it is determined that the output shaft angle θs has not changed (NO in S519), the mode 6 is continued. If it is determined that the output shaft angle θs has changed (YES in S519), the output shaft angle θs shifts to S520. In S520, the ECU 50 sets the control mode to the mode 0 which is the energization off control.

Returning to FIG. 10, in S106 of shifting to the mode determination process, the ECU 50 determines whether or not the control mode is any one of the modes 1 to 4. When the control mode is the modes 1 to 4, the motor 10 is PWM-controlled. When it is determined that the control mode is other than the modes 1 to 4 (NO in S106), the process shifts to S108. When it is determined that the control mode is one of the modes 1 to 4 (YES in S106), the process shifts to S107.

In S107, the ECU 50 controls the drive of the motor 10 by a PWM-control. The PWM control process will be described with reference to FIG. 13. In S701, the ECU 50 determines whether or not the control mode is one of the modes 1 to 3. When the control mode is the modes 1 to 3, the motor 10 is feedback-controlled. When it is determined that the control mode is not the mode 1 to the mode 3, that is, the mode 4 is selected (NO in S701), the process shifts to S708. When it is determined that the control mode is one of the modes 1 to 3 (YES in S701), the process shifts to S702.

In S702, the ECU 50 determines whether or not the control mode is the mode 1. When it is determined that the control mode is the mode 1 (YES in S702), the process shifts to S703. If it is determined that the control mode is not the mode 1, that is, is the mode 2 or the mode 3 (NO in S702), the process shifts to S704.

In S703, the feedback value setting unit 63 outputs the motor speed Msp as the speed feedback value Msp_fb to the speed deviation calculation unit 64. In S704, the feedback value setting unit 63 outputs the phase advance compensation value Msp_pl of the motor speed Msp as the speed feedback value Msp_fb to the speed deviation calculation unit 64.

In S705, the controller 65 calculates the feedback duty D_fb. In S706, the FF-term calculation unit 66 calculates the feedforward duty D_ff according to the control modes. In S707, the adder 67 adds the feedback duty D_fb and the feedforward duty D_ff to calculate the corrected feedback duty Da.

In S708 in which the control mode shifts to the mode 4 (NO in S701), the sudden braking duty calculation unit 70 sets the fixed duty Db in accordance with the rush speed Msp_i. When the fixed duty Db is set, the set value is maintained. In S709, the PWM signal generation unit 73 generates the command signal Spwm based on the calculated corrected feedback duty Da or the fixed duty Db. The ECU 50 controls the drive of the motor 10 based on the generated command signal Spwm.

Returning to FIG. 10, in S108 where the control mode is determined to be other than the modes 1 to 4 (NO in S106), the ECU 50 determines whether or not the control mode is the mode 5. When it is determined that the control mode is not the mode 5 (NO in S108), the process shifts to S110. When it is determined that the control mode is the mode 5 (YES in S108), the process shifts to S109.

In S109, the ECU 50 performs the stationary phase energization control. More specifically, the stationary phase energization control unit 75 generates the command signal Sfix for energizing the stationary phase in accordance with the actual counted value Cen. The ECU 50 controls the drive of the motor 10 based on the generated command signals Sfix.

In S110 when it is determined that the control mode is not the mode 5 (NO in S108), the ECU 50 determines whether the control mode is the mode 6 or not. When it is determined that the control mode is not the mode 6 (NO in S110), that is, when the control mode is the mode 0, the process shifts to S112. When it is determined that the control mode is the mode 6 (YES in S110), the process shifts to S111. In S111, the ECU 50 performs the return control. In S112, the ECU 50 turns off the energization of the motor 10.

Figure 14:
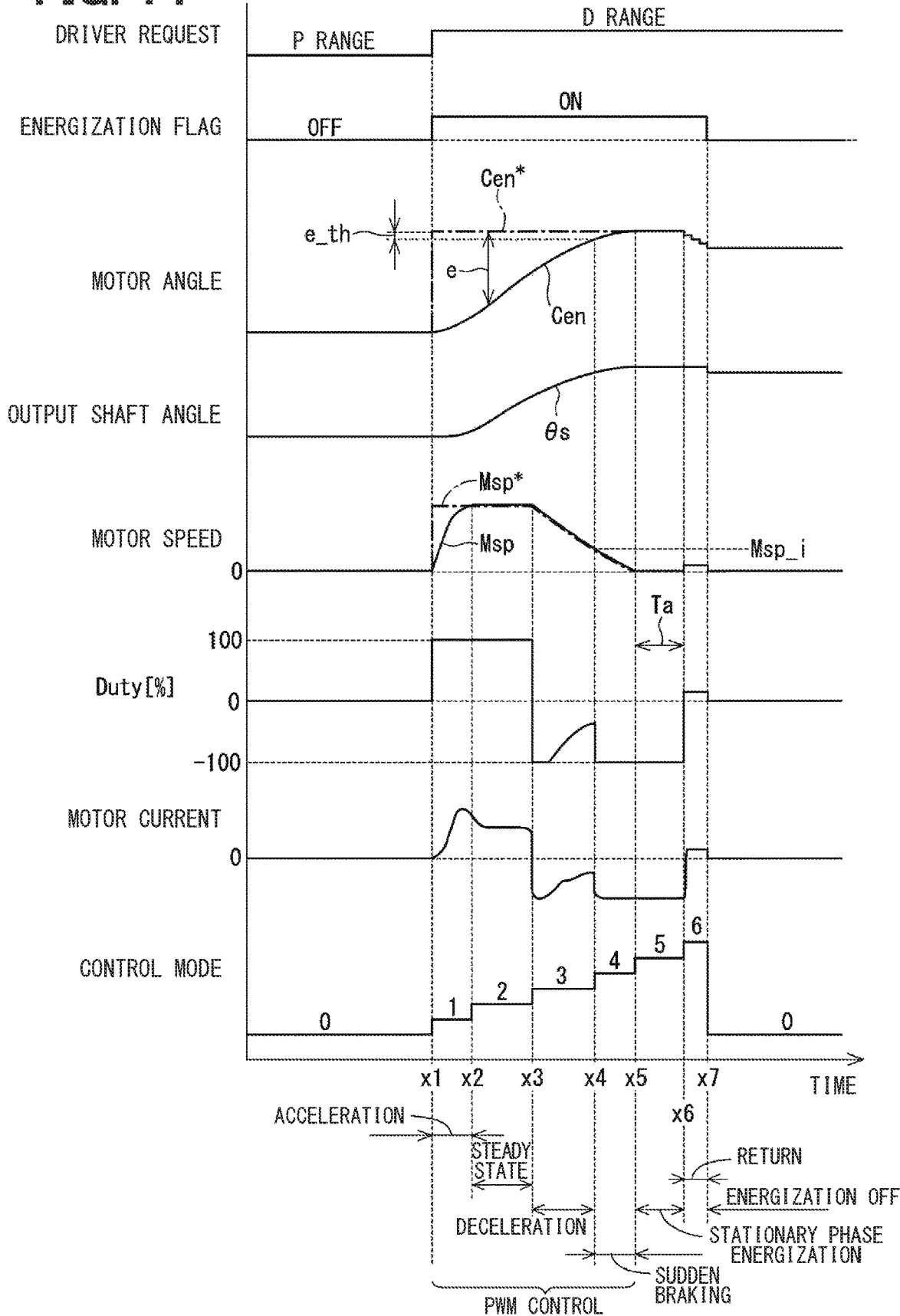
FIG. 14 is a time chart illustrating a motor control process according to the embodiment.

The motor control process according to the present embodiment will be described with reference to a time chart shown in FIG. 14. FIG. 14 shows the driver requested shift range, the energization flag, the angle of the motor 10, the output shaft angle, the motor speed, (f) the duty, the motor current, and the control mode from a top, with a common time axis taken as a horizontal axis. In FIG. 14, the angle of the motor 10 is indicated by a count value of the encoder 13. For the sake of illustration, a scale is changed as appropriate.

As shown in FIG. 14, when the driver requested shift range is maintained in the N range before the time x1, the control state of the motor 10 is set to the energization off control of the mode 0. At a time x1, when the driver requested shift range changes from the N range to the D range, the energization flag is turned on, and the control state is switched to the acceleration control of the mode 1. Further, the target count value Cen* is set in accordance with the driver requested shift range. In the acceleration control, the ECU 50 drives the motor 10 by the PWM control at the maximum duty. Further, in the acceleration control, the motor speed Msp for which the phase advance compensation is not performed is fed back.

When the motor speed Msp becomes higher than the target motor speed Msp* at a time x2, the control state is switched to the steady-state control of the mode 2. In the steady-state control, the phase advance compensation value Msp_pl, which is a value subjected to the phase advance compensation, is fed back. At the time x3, when the target motor speed Msp* falls, the control state is switched to the deceleration control of the mode 3. In the present embodiment, the phase advance compensation value Msp_pl subjected to the phase advance compensation is fed back in a steady state and a deceleration state in which hunting is apt to occur due to the detection delay of the rotation angle and the resolution of the detection. As a result, hunting in the steady state and the deceleration state is reduced.

At a time x4 when the angle deviation e becomes smaller than the angle determination threshold e_th, the control mode is switched to the sudden braking control of the mode 4. At the time of the sudden braking control, the drive of the motor 10 is controlled based on the fixed duty Db set in accordance with the rush speed Msp_i. The overshoot can be reduced by performing the sudden braking control. The drive of the motor 10 is controlled by the PWM control during a period from the time x1 to a time x5 at which the control shifts to the stationary phase energization control.

When the reverse of the motor 10 is determined at the time x5, the control mode is switched to the stationary phase energization control of the mode 5. In the present embodiment, the stationary phase energization control is continued from the time x5 until a time x6 at which the stationary phase energization duration Ta elapses. FIG. 14 shows an example in which the duty of the period from the time x5 to the time x6 at which the stationary phase energization control is performed is the maximum duty. With the execution of the stationary phase energization control, the motor 10 can be appropriately stopped in a state in which the detent roller 26 fits into the recess portion 224. At that time, it is not known at which position the motor 10 is stopped within the allowance range (refer to FIG. 9A). Further, since the current requested shift range is the D range, when the shift range is next switched, the rotation direction of the motor 10 is the reverse rotation direction.

Therefore, in the present embodiment, the return control is performed after the termination of the stationary phase energization control. In the return control, the motor 10 is rotated stepwise by the minimum drivable width corresponding to the resolution. While the motor shaft 105 rotates within the allowance range, the output shaft angle θs does not change. At a time x7, when the output shaft angle θs changes from a constant state, the motor shaft 105 and the output shaft 15 come into contact with each other, and it is considered that the allowance is completed, and the energization of the motor 10 is turned off. When the return control is completed, as shown in the FIG. 9B, the motor shaft 105 is moved to the reverse rotation side within the allowance range. When the requested shift range is the D range or the P range, the return control is performed after the stationary phase energization control, and the allowance is previously adjusted, whereby the allowance idle running at the time of the next shift range switching can be eliminated, so that the responsiveness is improved.

As described above, the shift-by-wire system 1 includes the motor 10, the output shaft 15 to which the drive of the motor 10 is transmitted, and the shift range switching mechanism 20. There is an allowance between the motor shaft 105, which is the rotation shaft of the motor 10, and the output shaft 15. The shift range switching mechanism 20 includes the detent plate 21, the detent roller 26, and the detent spring 25. The detent plate 21 is formed with the multiple recess portions 221 to 224 corresponding to the shift range, and rotates together with the output shaft 15. The detent roller 26 fits in any one of the recess portions 221 to 224 corresponding to the shift range. The detent spring 25 urges the detent roller 26 in a direction of fitting into the recess portions 221 to 224.

In the shift-by-wire system 1, the shift range control device 40 switches the shift range by controlling the drive of the motor 10, and includes the drive control unit 55, the stationary phase energization control unit 75, and the return control unit 77. The drive control unit 55 drives the motor 10 so that the detent roller 26 fits in any one of the recess portions 221 to 224 corresponding to the shift range. The stationary phase energization control unit 75 stops the motor 10 at a target position corresponding to the shift range.

When the requested shift range is a range corresponding to one of both ends of the multiple recess portions 221 to 224, the return control unit 77 performs the return control to return the rotational position of the motor 10 within the allowance range after stopping the motor 10 at the target position. With the execution of the return control for rotating the motor 10 in the direction opposite to the rotation direction of the motor 10 at the time of the present range switching to reduce the amount of allowance, the period during which the idle running state occurs at the time of the next range switching, and therefore, the responsiveness is improved.

In the present embodiment, the both ends of the multiple recess portions 221 to 224 are the recess portions 221 and 224, the range corresponding to the first recess portion 221 is the P range, and the range corresponding to the fourth recess portion 224 is the D range. The P range and the D range corresponding to the recess portions 221 and 224 at both the ends can also be regarded as ranges in which the rotation direction of the motor 10 is determined at the time of the next range switching. In addition, the P range and the D range corresponding to the recess portions 221 and 224 at both the ends can also be regarded as ranges in which the motor rotation direction at the time of the next range switching becomes the opposite direction from the present direction. In the present embodiment, when the requested shift range is a range other than both ends of the plurality of recess portions 221 to 224 (in the present embodiment, the R range and the N range), the rotation direction of the motor 10 at the time of the next range switching is not determined, and therefore, the return control is not performed.

The shift-by-wire system 1 is provided with the output shaft sensor 16 for detecting the rotational position of the output shaft 15. When the output shaft angle $\theta s$, which is the detection value of the output shaft sensor 16, changes, the return control unit 77 ends the return control. When the allowance between the motor shaft 105 and the output shaft 15 is clogged in the return direction, the return control can be appropriately terminated.

The return control unit 77 drives the motor 10 by a predetermined width corresponding to the resolution of the motor 10. In the present embodiment, in the return control, the motor 10 is driven stepwise by the minimum width corresponding to the resolution. As a result, the motor 10 can be driven slowly within the range of allowance. In the present embodiment, the detent plate 21 corresponds to the "driven member", the detent roller 26 corresponds to the "engagement member", and the detent spring 25 corresponds to the "urging member". The stationary phase energization control unit 75 corresponds to a "stop control unit". The target count value Cen* corresponds to a "target position".

Other Embodiments

In the embodiment described above, the motor is a three-phase brushless motor of a permanent magnet type. In another embodiment, the motor may be any motor capable of switching between the feedback control and the stationary phase energization control. In the embodiment described above, the motor is provided with the two winding sets. In another embodiment, the winding sets of the motor may be one set or three or more sets. In the embodiment described above, in the feedback control, the rectangular wave control by the 120° energization is performed. In another embodiment, in the feedback control, the rectangular wave control may be performed by energization at 180°. Further, the present disclosure is not limited to the rectangular wave control, and a PWM control may be performed by a triangular wave comparison method or an instantaneous vector selection method.

In the embodiment described above, an encoder is used as the rotation angle sensor for detecting the rotation angle of the motor. In another embodiment, the rotation angle sensor is not limited to the encoder, and any sensor such as a resolver may be used. Instead of the count value of the encoder, a value other than the encoder count value which can be converted into the rotation angle of the motor may be fed back. The same applies to the selection of the stationary phase in the stationary phase energization control.

In the embodiment described above, when the speed state is the steady-state control or the deceleration control, the phase advance value subjected to the phase advance filtering process is fed back. In another embodiment, the value obtained by performing a phase advance filtering process may be fed back even when the speed state is the acceleration control. In addition, the phase advance filtering process in at least one of the steady state and the deceleration state may be omitted. The determination method of the speed state is not limited to the method of the above embodiment, and any method may be used, for example, the determination using a differential value of the motor speed.

In the embodiment described above, one angle determination threshold is used to determine switching from the feedback control to the sudden braking control with a fixed duty. In other embodiments, the angle determination threshold may be variable according to the motor speed, for, example, the angle determination threshold is increased more as the motor speed is increased more. In the embodiment described above, the fixed duty in the sudden braking control is set according to the rush speed. In another embodiment, the fixed duty may be a predetermined value (for example, a maximum duty) regardless of the rush speed.

In the embodiment described above, in the return control, the motor is driven stepwise by the minimum width corresponding to the resolution of the motor. In another embodiment, the details of the control method may be anything as long as the motor can be driven slowly. In another embodiment, the details of the motor drive control method in each control mode may be any type.

In the embodiment described above, the detent plate is provided with four recess portions. In another embodiment, the number of recess portions is not limited to four and may be any number. For example, two recess portions of the detent plate may be used to switch between the P range and the NotP range. If there are two recess portions, both the recess portions are "both ends", so that the processing in S516 in FIG. 12 may be omitted. The shift range switching mechanism, the parking lock mechanism, and the like may be different from those of the embodiment described above. In another embodiment, the shapes of the driven member, the engagement member, the urging member, and the like may be different from those of the embodiment described above.

In the embodiment described above, a speed reducer is provided between the motor shaft and the output shaft. Although the details of the speed reducer are not mentioned in the above embodiment, any configuration may be adopted, for example, a cycloid gear, a planetary gear, a spur gear for transmitting a torque from a speed reduction mechanism substantially coaxial with the motor shaft to the drive shaft, or a combination of those components. In another embodiment, the speed reducer between the motor shaft and the output shaft may be omitted, or a mechanism other than the speed reducer may be provided. As described above, the present disclosure is not limited to the embodiments described above, and can be implemented in various forms without departing from the spirit of the present disclosure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A shift range control device that switches a shift range by controlling a driving operation of a motor in a shift range switching system,
the shift range switching system including:
the motor;
an output shaft to which the driving operation of the motor is transmitted; and
a shift range switching mechanism including a driven member having a plurality of recess portions and rotating together with the output shaft, an engagement member engaged in one of the recess portions according to the shift range, and an urging member urging the engagement member in a direction of engaging in the one of the recess portions,
wherein an allowance is disposed between a motor shaft as a rotation shaft of the motor and the output shaft,
the shift range control device comprising:
a drive control unit that drives the motor such that the engagement member engages one of the recess portions according to a requested shift range;
a stop control unit that stops the motor at a target position according to the requested shift range; and
a return control unit that performs a return control for returning a rotation position of the motor within a range of the allowance after the motor stops at the target position when the requested shift range corresponds to one of both ends of the plurality of recess portions,
wherein a P range and a D range that corresponds to the recess portions at both ends have a rotation direction of the motor at a next range switching time opposite to a present range switching time; and
when the requested shift range corresponds to the plurality of recess portions other than both ends, the rotation direction of the motor at the next range switching time is not determined, and the return control is not performed and an energization of the motor turns off after the motor stops at the target position.

2. The shift range control device according to claim 1, wherein:
the shift range switching system includes an output shaft sensor that detects a rotational position of the output shaft; and
the return control unit stops the return control when a detection value of the output shaft sensor changes.

3. The shift range control device according to claim 1, wherein:
the return control unit drives the motor by a minimum width corresponding to a resolution of the motor.

4. The shift range control device according to claim 1, wherein:
the return control includes rotating the motor in a direction opposite to the rotation direction of the motor at the present range switching time and reducing an amount of the allowance to thereby reduce a period during which an idle running state of the motor occurs at the next range switching time.

5. The shift range control device according to claim 1, wherein:
wherein the requested shift range corresponding to the plurality of recess portions other than both ends is a R range or a N range.

6. The shift range control device according to claim 5, wherein the shift range control device further comprises a control unit configured to:
determine whether the requested shift range corresponds to the P range or the D range or corresponds to the R range or the N range;
upon determination that the requested shift range corresponds to the P range or the D range, initiate a return control mode in which the return control is performed by the return control unit; and
upon determination that the requested shift range corresponds to the R range or the N range, initiate an energization off mode in which the return control is not performed and the energization of the motor turns off after the motor stops at the target position.

* * * * *